Dec. 19, 1933.   J. H. G. BURMEISTER   1,940,074
JOINT FOR PIPES AND THE LIKE
Filed Sept. 8, 1931   3 Sheets-Sheet 1

INVENTOR
J. H. G. BURMEISTER
BY
ATTORNEYS

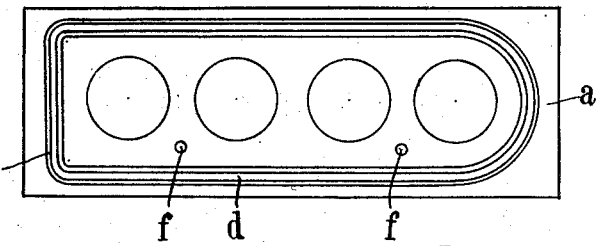
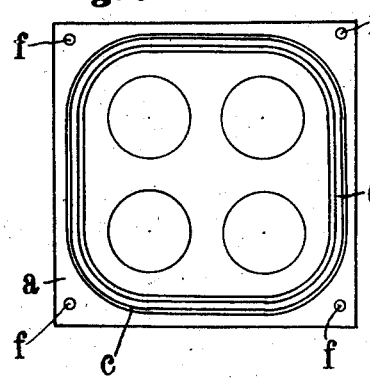
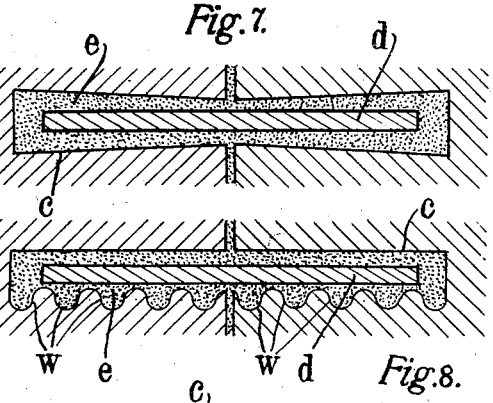
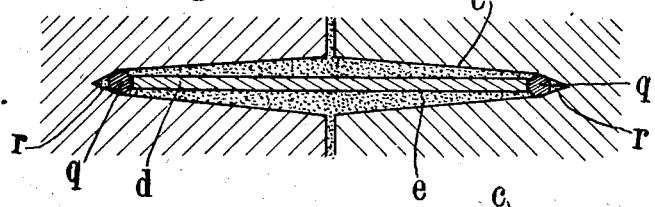
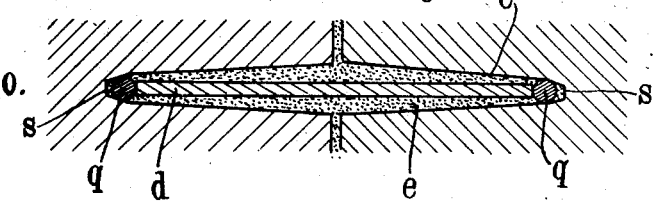
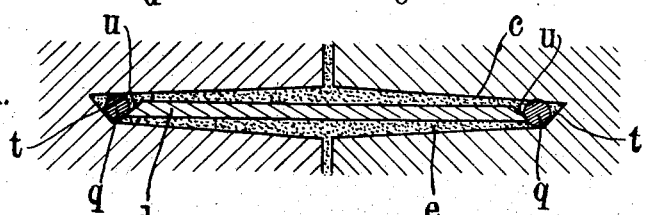
INVENTOR
JOACHIM H.G.BURMEISTER
BY
ATTORNEYS Dec. 19, 1933.  J. H. G. BURMEISTER  1,940,074
JOINT FOR PIPES AND THE LIKE
Filed Sept. 8, 1931   3 Sheets-Sheet 3

INVENTOR
JOACHIM H. G. BURMEISTER
BY
*Richards Shun*
ATTORNEYS

Patented Dec. 19, 1933

1,940,074

UNITED STATES PATENT OFFICE 1,940,074

JOINT FOR PIPES AND THE LIKE

Joachim Heinrich Gustav Burmeister, Hamburg, Germany

Application September 8, 1931, Serial No. 561,605, and in Rumania October 13, 1930

2 Claims. (Cl. 285—111)

The present invention relates to a gas and water tight connection for pipes or pipe sections in one or more parts, and has for its object to maintain such connections absolutely gas and water tight, even in the case of sinking or displacement of separate pipes or pipe sections.

In connection with previously known pipe connections and connections of sections there was always the difficulty that even though a gas and water tight joint was effected with considerable trouble the result was immediately destroyed as soon as a slight relative displacement or sinking of the pipes or sections took place at any point.

Pipe connections are known in which a sleeve formed of an iron band is fitted into grooves filled with cement and provided in the abutting faces of the parts to be connected together. Such a joint, however, even if it could be made gas and water tight, would leak if there was the least displacement of the pipes or sections relatively to one another, as both the cement and the iron band are unyielding and, consequently, cracks would occur in the joint through which water and gas could pass freely.

It is the object of the present invention to eliminate these disadvantages by fitting into grooves provided in the abutting faces of the parts to be connected together and containing an elastic packing mass, such as wax, putty, soap-like greases, tar and asphalt products or the like, a sleeve of elastic material such as rubber, asphalt felt, leather or the like.

In order to obtain a more effective securing of the sleeve, the grooves may be made of a particular shape. The grooves may have a section which from the end surface rearwardly increases or diminishes. One or both of the walls of the grooves may be provided with ribs, grooves or the like or be roughened. At the bottom of the groove there may also be provided a packing ring, which, when fitting the sleeve into position, is pressed against the wall of the groove at least at two points. The grooves at the bottom may be in the form of an acute or obtuse angle, or the grooves are at their end provided with an inclined portion and the sleeves at their end are provided with an inclined portion extending in the opposite direction to the inclined portion of the grooves.

When dealing with pipes or sections formed of a number of parts, as are used for replacing positioned damaged pipes or sections, the parts are preferably provided on their open sides with enlarged walls for the reception of grooves for longitudinal sleeves. In order that as few joints as possible have to be rendered fluid tight, there is a departure in the case of a number of superposed passages or series of passages from the previous division into three or more parts, of which the joints are on the outer side, and the pipes or sections are also divided into two portions forming a casing and the separate passages are formed in the interior of the casing by fitting therein one or more loose members. In order to obtain a better seating, the members may be fitted into grooves or recesses in the two parts of the casing.

A number of examples of construction in accordance with the present invention are illustrated in the accompanying drawings, wherein:—

Figures 3 to 6 show various forms of cross section of the sleeve for different sections.

Figures 7 and 8 show two forms of grooves.

Figures 9 to 11 show three different forms of grooves with the provision of a packing ring in the bottom of the grooves.

Figure 1:
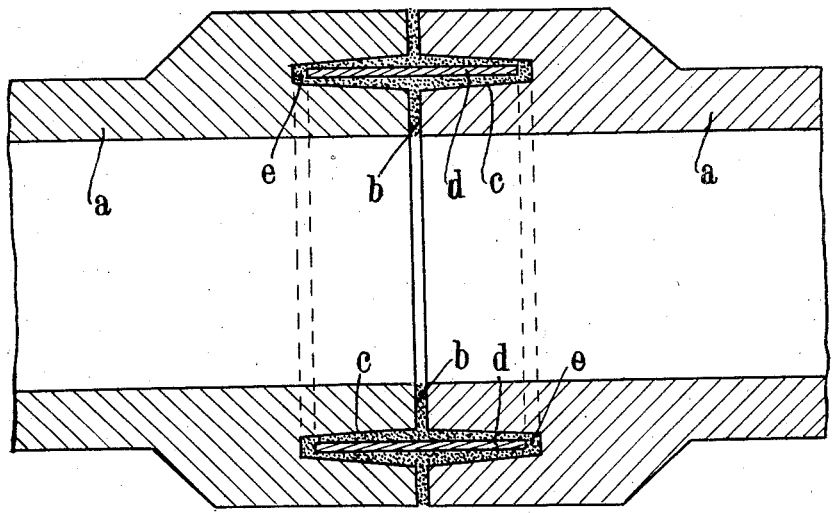
Figure 1 shows a longitudinal section of the connection of two sections.
Figure 2:
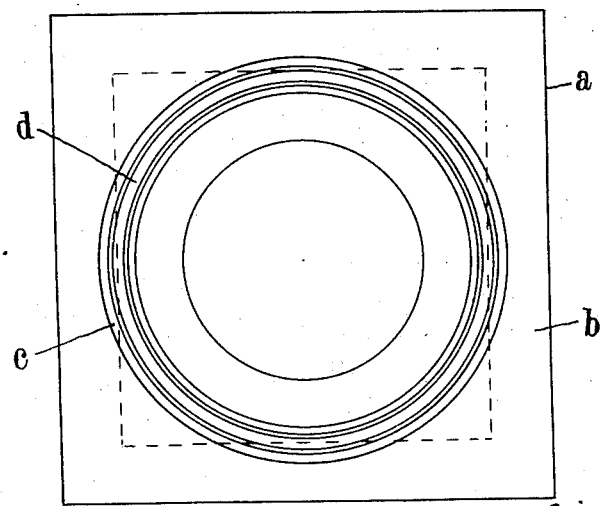
Figure 2 is an end view of one of the sections.

The sections $a$ according to Figures 1 and 2 are provided at their abutting surfaces $b$ with grooves $c$ which in the present case are annular and are gradually reduced in section rearwardly. Into the grooves $c$ is fitted a sleeve $d$ of elastic material, such as rubber, asphalt felt, leather or the like, whilst the grooves $c$ are filled with an elastic packing mass, such as wax, putty, soap-like greases, tar and asphalt products or the like.

When connecting together two sections, the sleeve $d$ is first fitted into the groove $c$ filled with the packing mass $e$ in one section, and then the second section is moved against the first, whereby the portion of the sleeve projecting from the first section enters the groove $c$ filled with the packing mass of the second section.

In this manner the two sections are connected together in a gas and water tight manner, and should any relative sinking or displacement of the sections occur, the sleeve engaging in the grooves filled with the packing mass always maintains a gas and water tight joint as the elastic sleeve yields whilst the pipes are held together in the known manner by iron pins $f$.

The connection may be used for pipes and sections of all kinds, the shape in cross section of the sleeve depending upon the shape in cross section of the parts to be connected together, that is to say it may be circular, polygonal, oval and the like. In this manner it is also possible to connect together members having two or more passages.

Figure 3:
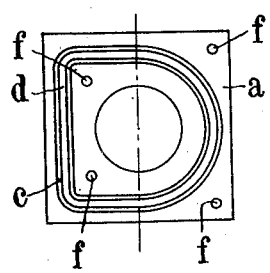
Figure 4:
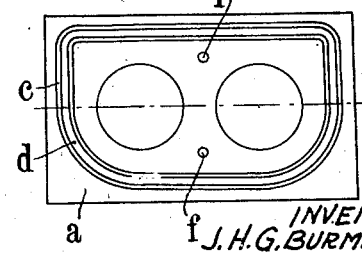

Examples of different forms of cross section are shown in Figures 3 to 6, each of the Figures 3 to 5 for the same number of pipes showing two different forms of construction of the sleeve. In the sections with the number of pipes as shown in Figures 4 to 6, it will be understood that the sleeves may also be constructed that a separate sleeve is provided with each pipe, but in such a case the distance between the separate pipes must be enlarged.

In the form of construction shown in Figures 1 and 2 the grooves are reduced inwardly. As shown in Figure 7, the grooves may also have a shape which is enlarged inwardly conically away from the abutting surface. In this manner the sleeve, together with the packing mass, is caused to form a unitary dove-tailed member between two parts to be connected together, and thus there is no possibility of release of the connection, even in the case of relative movement of the pipes or sections, whilst at the same time the packing mass at the opening of the groove is particularly tightly pressed so that any admission of moisture is prevented. As shown in Figure 8, the grooves may be provided on one or both walls with grooves, ribs or the like or be roughened so as to obtain a firm hold on the wall of the groove, and the penetration of moisture is rendered more difficult as the moisture must pass around the separate recesses and ribs of the wall of the groove.

A further security of the joint against the penetration of moisture can be obtained by providing at the bottom of each groove a packing ring $q$, as shown in Figures 9 to 11, and which is pressed by the sleeve against the wall of the groove and thus forms a separate joint between the sleeve and the ring and between the ring and the wall of the groove. The packing ring $q$ may be made of any suitable material, such as Para rubber, hemp or the like. At their ends the grooves may be in the form of an acute angle $r$ or an obtuse angle $t$, whilst the sleeve at its adjacent end has an inclined portion $u$ arranged in the opposite direction to the inclined portions $t$.

Figure 12:
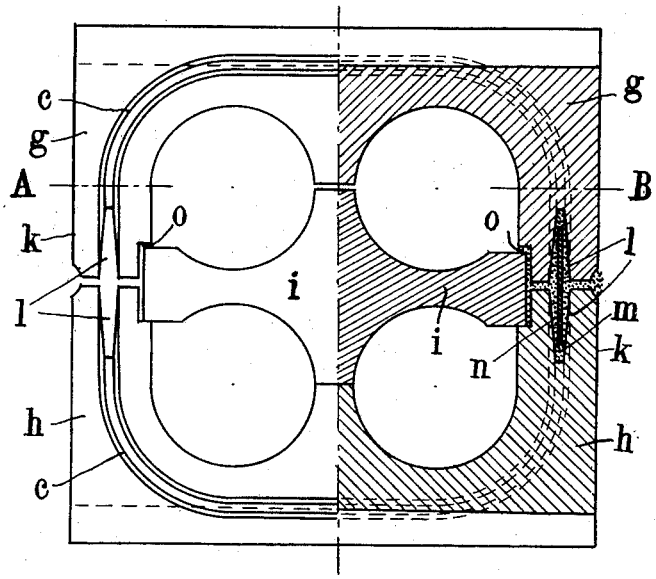
Figure 12 shows an end view of a section formed of a number of parts and provided with four passages.
Figure 13:
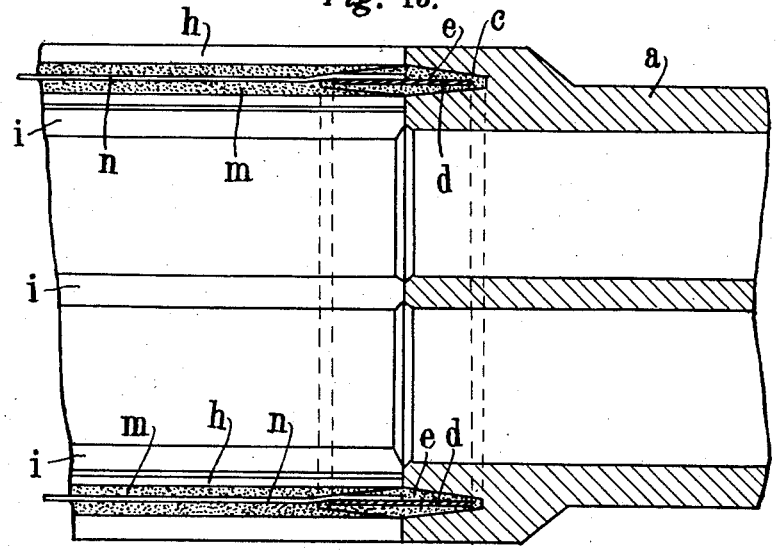
Figure 13 is a longitudinal section through a joint of a section in one part having an upper portion formed of a number of parts and removed along the line A—B of Figure 12.

In the case of divided conduit sections or pipes, as mainly used for replacing existing damaged conduits or pipes, it is necessary to form joints also at the supporting edges in addition to those at the end surfaces (Figures 12 and 13). As the side walls $k$ are usually too thin, they are enlarged to the thickness of the flanges and the abutting surfaces of the sections are provided with grooves $l$. Into the grooves $l$, fitted with an elastic packing mass $m$, are then fitted elastic packing sleeves $n$. The packing sleeves for the longitudinal sides are preferably so constructed that they overlap the sleeves which join the joints at the end surfaces.

For obtaining an efficient packing a departure is made from the previous division of the sections, as hitherto there was always a section part more than there were passages, and, consequently, a number of joints had to be packed. According to Figure 12 the pipes or sections are now only divided into two portions $g$ and $h$, and the separate passages or series of passages are formed by members $i$ corresponding with the shape of the passages and adapted to be fitted separately into position so that on the outside there is always only a single longitudinal joint to be closed on each longitudinal side. The members $i$ may then be fitted into recesses or grooves $o$ provided in the inner walls of the two section portions $g$ and $h$.

Having now particularly described and ascertained the nature of my said invention and in what manner the same is to be performed, I declare that what I claim is:

1. A gas and water tight connection for pipes and castings, comprising two members having abutting surfaces, a flexible sleeve made of a non-metallic material selected from a class consisting of rubber, asphalt, felt and leather, said sleeve fitting into grooves formed in said abutting surfaces, a separate packing ring fitted at the bottom of each one of said grooves, said ring being pressed by said sleeve against the wall of the groove at least at two points, and a plastic filling mass consisting of a material selected from a class consisting of wax, putty, soap-like grease, tar and asphalt products, said mass filling said grooves and surrounding said flexible sleeve.

2. A gas and water tight connection for pipes and castings, comprising two members having abutting surfaces, a flexible sleeve made of a non-metallic material, said sleeve fitting into grooves formed in said abutting surfaces, said grooves being inclined at their bottoms, a separate packing ring fitted at the bottom of each one of said grooves, said ring being pressed by said sleeve against the wall of the groove at least at two points, said ring having a portion inclined in the opposite direction to the inclination of the bottom of the groove, and a plastic filling mass filling said grooves and surrounding said flexible sleeve.

JOACHIM HEINRICH
GUSTAV BURMEISTER.